United States Patent [19]

Shannon

[11] Patent Number: 4,637,896
[45] Date of Patent: Jan. 20, 1987

[54] POLYMERIC LIQUID CRYSTALS

[75] Inventor: Paul J. Shannon, Millersville, Pa.

[73] Assignee: Armstrong World Industries, Inc., Lancaster, Pa.

[21] Appl. No.: 660,038

[22] Filed: Oct. 12, 1984

Related U.S. Application Data

[63] Continuation-in-part of Ser. No. 450,089, Dec. 15, 1982, abandoned.

[51] Int. Cl.[4] .................... C09K 19/36; C09K 19/38; C08F 12/32; G01K 11/16
[52] U.S. Cl. .................................. 252/299.7; 428/1; 374/161; 374/162; 526/284
[58] Field of Search .................... 252/299.01, 299.7; 260/397, 397.1, 397.2; 428/1; 526/284

[56] References Cited

U.S. PATENT DOCUMENTS 4,293,435 10/1981 Portugall et al. ............... 252/299.01

OTHER PUBLICATIONS

Tsutsui et al, CA 91:176075, 1979.
Freizdon et al, Mol. Cryst. Liq. Cryst., 1982, vol. 88, 87–97.
Tsutsui et al, Polymer. Comm., 1980, vol. 21, 1351–52.
Freizdon et al, Adv. Liq. Cryst. Res. & Appl., 1980, 890–914.
Shibayev et al, Polymer Science USSR, vol. 21, 2044–2050.
Minezaki et al, Makromol. Chemie, 175, 1974, 3017–21.
Kharitonov, CA 94:157412z, 1981.
Nyitrai et al, CA 93:85755t, 1980.
Mori et al, CA 88:23513, 1978.

*Primary Examiner*—Teddy S. Gron
*Assistant Examiner*—Jack Thomas
*Attorney, Agent, or Firm*—Laird F. Miller

[57] ABSTRACT

The present invention concerns novel cholesteric liquid crystalline monomers and combinations thereof with materials that will support formation of a mixture which demonstrates cholesteric liquid crystalline properties. These materials may be formed as coatings, heated or cooled to a desired temperature to cause the cholesteric coating to exhibit a desired optical response, and photopolymerized to essentially fix the optical characteristics of the resulting polymer.

16 Claims, No Drawings

POLYMERIC LIQUID CRYSTALS

This application is a continuation-in-part of application Ser. No. 450,089, filed Dec. 15, 1982, now abandoned.

The present invention relates to liquid crystals and more particularly to polymeric liquid crystals which have fixed optical characteristics.

BACKGROUND OF THE INVENTION

The existance of liquid crystalline materials has been recognized since the late 1800's. The terms "liquid crystal" or "mesogen" refer to a number of states of matter which lie between solid crystals and isotropic liquids, the latter being randomly ordered. Liquid crystalline materials possess some structural characteristics of crystals, yet they may be viscous or quite mobile liquids.

The varying degrees of order which are possessed by liquid crystals give rise to three distinct types of structures called mesophases. A liquid crystal, when in the crystalline state, has a three-dimensional uniform structure with orientational and positional order. As the crystal is heated, it may initially lose one dimension of its positional order. This is referred to as the smectic mesophase, a phase in which the liquid crystal retains the orientational order of the crystalline state, as well as two-directional positional order.

With further heating, the liquid crystal can convert to the nematic mesophase. In this phase, the remaining positional order is lost and the liquid crystalline material retains only the one-directional orientational order of the crystalline state. The molecular order of nematic mesophases is characterized by orientation of the molecules along an axis which coincides with the long axis of the molecules. The centers of gravity of the molecules are arranged randomly so that no positional long-range order exists.

In the cholesteric mesophase, the molecular order is characterized by orientation of the molecules along an axis which coincides with the long molecular axis as in a nematic phase; however, the axis changes direction in a continuous manner along a second axis perpendicular to the first. This results in a long-range helicoidal ordering of molecules that gives rise to the unusual optical properties characteristic of cholesteric mesophases.

The term "cholesteric" is primarily of historical significance because the first discovered liquid crystalline material that exhibited a cholesteric mesophase was cholesteryl benzoate. It has long been recognized, however, that the presence of the cholesterol moiety is not required for formation of a cholesteric mesophase. All that is required is a nematic component and a chiral or optically active component. These components can be incorporated in one molecule, as in cholesteryl esters, or they can be separate molecules. Thus, a nematic mesophase can be "doped" with a small amount of optically active material to generate a cholesteric mesophase, more accurately termed a "twisted nematic" mesophase.

The optical properties characteristic of cholesteric mesophases include the selective reflection of light in the infrared, visible or ultraviolet regions, circular dichroism and a high degree of optical rotary power, all of which are well known in the art. Accordingly, the optical response of a cholesteric mesophase will include all the optical properties of a cholesteric mesophase.

One optical property, the ability of cholesteric mesophases to selectively reflect light in the infrared, visible or ultraviolet region, is useful in characterizing the structure of cholesteric mesophases. The wavelength of maximum reflection $\lambda_R$ is directly dependent on the helical pitch (P, the distance the helix takes to repeat itself) and the average index of refraction ($\bar{n}$) of the cholesteric mesophase by $\lambda_R = \bar{n}P$. The pitch can be quite sensitive to changes in temperature or composition of the mesophases and, as a result, these functions have been used to control the wavelength of maximum reflection. Mesophases of cholesteryl alkanoates typically show a decrease in $\lambda_R$ with increasing temperature; thus a cholesteric mesophase reflecting red light will shift the reflection band toward the violet with increasing temperatures.

The ability of a cholesteric mesophase to reflect light also is dependent upon the alignment or texture of the cholesteric mesophase. As is well known in the art, there are three common textures for cholesteric mesophases. The most easily characterized texture is the cholesteric planar texture where the helicoidal ordering is aligned such that the pitch axis is perpendicular to the plane of the film surface. This planar texture can reflect visible light under certain circumstances resulting in the formation of brilliant colors. The homeotropic or fingerprint texture has the helicoidal pitch axis aligned parallel to the plane of the film surface. Mesophases with a large pitch exhibit a finterprint-type pattern visible under an optical microscope. In the focalconic texture there is no preferential alignment of the helicoidal axes in any one direction in the microdomains of the cholesteric mesophase; therefore, only a random scattering of light is observed and no colors are formed from reflection. This texture is most readily achieved by cooling a cholesteric material from the isotropic state into the cholesteric state without disturbing (mechanically shearing) the mesophase. These textures are useful in controlling the optical responses of cholesteric mesophases, as will be discussed in more detail herein.

THE PRIOR ART

Substantial interest has been shown in liquid crystalline materials which exhibit cholesteric mesophases because these materials exhibit unique optical properties such as selective reflection of visible light to produce iridescent colors, as well as circular dichroism. Thus, for example, U.S. Pat. No. 3,720,623 discloses mixtures of cholesteric and nematic liquid crystals which are useful in temperature-sensitive visual displays; U.S. Pat. No. 3,766,061 discloses decorative films comprising solid materials which are proportioned such that the composition demonstrates cholesteric properties; U.S. Pat. No. 3,923,685 discloses cholesteric materials which convert to the nematic state upon exposure to an electric field; and U.S. Pat. No. 3,931,041 discloses combinations of nematic and potentially cholesteric material which are useful in imaging and display devices.

Although the colored images produced using cholesteric materials are quite useful, most such images are not permanent. Accordingly, there has been substantial interest in preparing cholesteric materials in which the color can be fixed. Thus, U.S. Pat. No. 3,766,061, which was referred to above, discloses decorative films in which the color is fixed by cooling. In addition, U.S. Pat. No. 4,293,435 discloses a polymeric liquid crystal in which the color is fixed by lowering the temperature of the polymer below the glass transition temperature, thereby fixing the polymer in the solid state.

The use of temperature changes to fix the color is not always practical, however, and there has been interest in developing cholesteric materials whose color can be fixed by other means, such as by photopolymerization, whereby the resulting fixed color is temperature insensitive. Applicant is aware of only one such polymer. This was reported by Tsutsui et al. who disclosed in Polymer, 21, 1351 (1980) that poly(gamma-butyl-L-glutamate) in trimethylene glycol dimethacrylate could be photopolymerized to fix the color such that it was temperature insensitive. All other attempts to polymerize a cholesteric mesophase comprising a cholesteryl ester have resulted in total reorganization of the mesophase with resulting loss of the cholesteric optical properties.

Accordingly, one objective of the present invention is to provide new polymeric cholesteric liquid crystalline materials having fixed, essentially temperature-insensitive colors.

Another objective of the present invention is to provide combinations of monomeric compounds which provide variable optical responses over a variety of temperature ranges.

Yet another objective of the present invention is to provide polymeric coatings having fixed optical responses which are useful in a variety of optical devices.

These and other objectives of the present invention will become apparent from the detailed description of preferred embodiments which follow.

SUMMARY OF THE INVENTION

The present invention concerns novel cholesteric liquid crystalline monomers and combinations thereof with materials that will support formation of a mixture which demonstrates cholesteric liquid crystalline properties. These materials may be formed as coatings, heated or cooled to a desired temperature to cause the cholesteric coatings to exhibit a desired optical response, and photopolymerized to essentially fix the optical characteristics of the resulting polymer.

DETAILED DESCRIPTION OF PREFERRED EMBODIMENTS

In one embodiment the present invention comprises a composition suitable to provide a polymeric coating having fixed optical properties, said composition comprising a photopolymerizable monomer having the structure

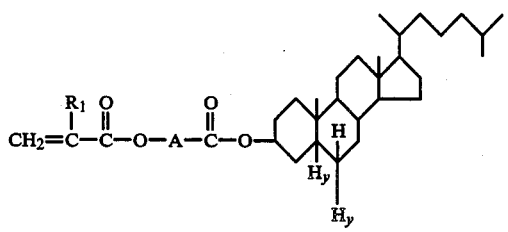

where $R_1 = H$ or $CH_3$, $A = -R_2-$, $-R_3O-$, or $R_4O-$, $R_2 =$ an alkylene chain having 3-14 methylene or lower alkyl-substituted methylene groups, $R_3 =$ an alkylene chain having from 2-14 methylene or lower alkyl-substituted methylene groups, $R_4 =$ an alkylene or lower alkyl-substituted alkylene ether, diether or triether having a total of from 3-14 carbon atoms in the alkylene moieties, provided that the terminal alkylene moiety adjacent the carbonate moiety comprises not less than two carbon atoms, and $y = 0$ or 1; and a suitable photoinitiator.

In a second embodiment, the present invention comprises a polymeric coating having a fixed optical response, said coating being obtained by photopolymerizing a composition comprising a photopolymerizable monomer having the structure

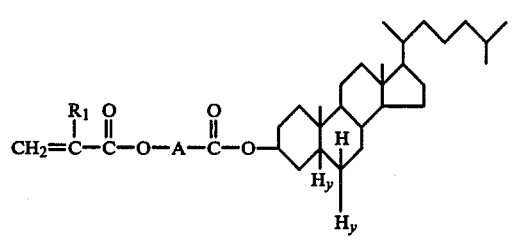

where $R_1 = H$ or $CH_3$, $A = -R_2-$, $-R_3O-$ or $R_4O-$, $R_2 =$ an alkylene chain having from 3-14 methylene or lower alkyl-substituted methylene groups, $R_3 =$ an alkylene chain having from 2-14 methylene or lower alkyl-substituted methylene groups, $R_4 =$ an alkylene or lower alkyl-substituted alkylene ether, diether or triether having a total of from 3-14 carbon atoms in the alkylene moieties, provided that the terminal alkylene moiety adjacent the carbonate moiety comprises not less than two carbon atoms, and $y = 0$ or 1; and a suitable photoinitiator.

In a third embodiment the present invention comprises a process for preparing coatings comprising polymeric liquid crystalline materials having a fixed optical response, said process comprising the steps of preparing a coating comprising a photopolymerizable monomer having the structure

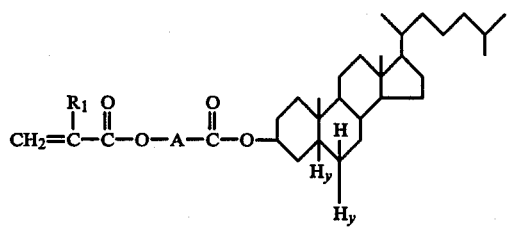

where $R_1 = H$ or $CH_3$, $A = -R_2-$, $-R_3O-$ or $R_4O-$, $R_2 =$ an alkylene chain having from 3-14 methylene or lower alkyl-substituted methylene groups, $R_3 =$ an alkylene chain having from 2-14 methylene or lower alkyl-substituted methylene groups, $R_4 =$ an alkylene or lower alkyl-substituted alkylene ether, diether or triether having a total of from 3-14 carbon atoms in the alkylene moieties, provided that the terminal alkylene moiety adjacent the carbonate moiety comprises not less than two carbon atoms, and $y = 0$ or 1; and a suitable photoinitiator; optionally aligning said coating; adjusting the temperature of said coating to obtain a desired optical response; and photopolymerizing said coating.

Derivatives of cholesterol (where $y = 0$) and 5,6-dihydrocholesterol (where $y = 1$) may be used to practice the present invention. The derivatives involve modifications in the three-position side chain; thus, the polymerizable moiety of the side chain can comprise an acrylate or methacrylate moiety which is bridged to an ester or carbonate linkage. Where an ester linkage is present, the bridge will comprise an alkyl chain comprising from 3-14 methylene or lower alkyl-substituted methylene groups. Lower alkyl as used herein shall mean an alkyl group comprising from 1-4 carbon atoms. The acrylate and methacrylate esters have been reported in the Russian literature (e.g., see Y. S. Freidzon et al. in *Mol. Cryst. Liq. Cryst.*, 88, 87 (1982)); however, these esters were prepared for use in solution polymerization reactions and there was no appreciation of their utility for preparing photopolymerized films as disclosed herein.

On the other hand, where a carbonate linkage is present, the bridge may be more complex. Thus, it may comprise from 2-14 methylene or lower alkyl-substituted methylene groups, or an alkylene or lower alkyl-substituted alkylene ether, diether or triether having a total of from 3-14 carbon atoms in the alkylene moieties, provided that the terminal alkylene moiety adjacent the carbonate moiety comprises not less than two carbon atoms. Examples of ether moieties which may be utilized in practicing the present invention are those which are analogous to ethylene glycol, diethylene glycol, triethylene glycol, tetramethylene glycol, 3,3'-oxybis-1-propanol, 4,4'-oxybis-1-butanol, 1,1'-oxybis-2-propanol, and the like.

When in the pure state the compounds of the present invention are somewhat difficult to work with because they tend to crystallize at inopportune moments. Furthermore, it is difficult to obtain colored polymers from the pure monomers because the majority of them will show either no colored cholesteric mesophase, or a very narrow colored cholesteric mesophase. Therefore, the pure compounds of the present invention are limited in their ability to produce polymeric coatings having desirable optical responses.

Surprisingly, it has been discovered that these limitations may be overcome and that colored and uncolored coatings can be prepared comprising a compound of the presennt invention and a "second material". The second material may be either another compound of the present invention, or another material having a different structure. In either event, the combination must be suitable to provide a coating that exhibits cholesteric liquid crystalline properties. When prepared and photopolymerized in the presence of a suitable photoinitiator, coatings having fixed optical characteristics can be obtained. The terms "fixed optical characteristics" and "fixed optical response" as used herein refer to polymerized coatings which exhibit fixed cholesteric liquid crystalline properties, but which may also exhibit non-cholesteric properties.

If the coating is colored, the fixed color will preferably be substantially the same as the color of the unpolymerized coating; however, in certain instances, it may be desirable to obtain a polymerized coating having a fixed color which differs from that of the unpolymerized coating. Thus, all such possibilities are contemplated by the present invention. Details relating to the preparation of the novel compounds used herein are set forth in my application Ser. No. 450,088, abandoned, the contents of which are hereby incorporated by reference. Furthermore, it will be understood that the term "coating" as used herein should not be narrowly construed, and is intended to describe various types of layers comprising the liquid crystalline materials, including films, laminates, prints and the like.

A preferred method of practicing the present invention involves the preparation of a film which exhibits desired optical characteristics at a specific temperature. For colored films, this has been conveniently achieved, for example, by preparing a mixture of the materials which provide the cholesteric film, the photoinitiator and, optionally, a second material that will support the formation of a film that exhibits cholesteric liquid crystalline properties; heating the mixture to obtain a viscous liquid; spreading and aligning the liquid between glass plates; submerging the plates in a thermostatic water bath; and adjusting the temperature to obtain a desired color.

Certain combinations of cholesteryl ester monomers may be preferred over others for this purpose because they provide a full red-to-violet color response over a broad temperature range. In addition, such combinations may give a desired color intensity at a given temperature or over a given temperature range. Examples of such combinations are Compounds Va and Ve; Vb and Vf; Va and IXc; and Vb and IXb, which are described in the examples. Useful color responses have been obtained with these materials even though the compositions have comprised weight ratios of from 80:20 to 20:80 of the liquid crystalline components. It is noted, however, that these ratio ranges are provided as illustrations, and they are not intended to indicate that compositions comprising less than 20 weight percent of a given component will provide an inadequate response.

For uncolored films, the optical characteristics must be determined spectrophotometrically. The film is then irradiated with a suitable radiation source, such as a mercury lamp. The polymeric films thus obtained can remain substantially unchanged even when exposed to high temperatures for several weeks, depending on the character of the second component as discussed in more detail below.

Examples of photoinitiators which will be useful to practice the present invention are benzophenone, 2,2-dimethoxy-2-phenylacetophenone, 2,2-diethoxyacetophenone, 2-benzoyloxyacetophenone, 2-chlorothioxanthone and 2-hydroxycyclohexyl phenyl ketone, all of said compounds being provided by way of illustration and not limitation.

A wide variety of combinations may be made to produce coatings having different optical characteristics, and these will be largely a matter of choice to the artisan. Nevertheless, several generalizations can be made regarding combinations of the novel monomeric compounds as described herein.

First, combinations of similar monomers will give coatings which exhibit cholesteric mesophases over a temperature range which is comparable to that of the individual monomers. For example, if an acrylate/methacrylate pair of cholesterol derivatives is prepared wherein $y=0$ and $A=-(CH_2)_{10}-$, the methacrylate ($R_1=CH_3$) exhibits a color range (monotropic only) at 55.8°-55.3° C., whereas the acrylate ($R_1=H$) exhibits a color range at 57.8°-59.2° C. A 1:1 mixture of the two exhibits a colored mesophase range of 56.5°-55.9° C.

Secondly, combinations of similar monomers having very different alkyl chain lengths provide mixtures with substantially broadened mesophase ranges as compared to the individual components. For example, if a pair of acrylate monomers ($R_1=H$ and $y=0$) is prepared wherein one monomer has $A=-(CH_2)_{10}-$, and the other monomer has $A=-(CH_2)_3-$, the first monomer exhibits a color range of 57.8°-59.2° C. whereas the second monomer exhibits no color. A 1:1 mixture of the two exhibits a substantially broader color range of 68° to −15° C., −15° C. being the lower detection limit of the testing apparatus which was used. Accordingly, it will be seen that careful mixing of monomers can provide mesophases which exhibit full optical responses over a variety of temperature ranges.

Thirdly, the addition of small amounts of non-mesogenic materials to a mixture of mesogenic materials can lead to substantial changes in the optical response ranges. Thus, for example, the addition of 2% of a photoinitiator or cross-linking agent can cause a downward shift of 10 degrees or more in the color range exhibited by a mixture of the pure mesogenic materials.

As indicated above, an alternative method of preparing photopolymerized coatings having fixed optical properties is by combining a compound of the present invention with a different type material which is suitable to permit formation of a coating that exhibits cholesteric liquid crystalline properties. It is not necessary that the second component be either photopolymerizable or mesogenic; nevertheless, it is preferred that it be photopolymerizable in order to provide stable polymeric coatings.

A wide variety of alternative materials will be suitable to provide characteristic coatings. The types of materials which will preferably find utility are those which are mesogenic but not polymerizable; those which are non-mesogenic but polymerizable; and those which are both mesogenic and polymerizable. Examples of such materials, which are provided by way of illustration and not limitation, are as follows. In the first category are mesogenic materials such as cholesteryl oleyl carbonate and 2-methyl-1,4-phenylene-bis(4'-hexyloxybenzoate), which are capable of demonstrating liquid crystalline properties, but which possess no photopolymerizable moiety. In the second category are photopolymerizable monomers which are incapable of demonstrating liquid crystalline properties. At one extreme are cross-linking agents which bear little resemblance to mesogenic materials whereas at the other extreme are materials which, though non-mesogenic, are closely related to mesogenic materials. An example of the latter is p-methoxyphenyl-p-(6-methacryloyloxhexyloxy)benzoate, whereas examples of the former are conventional cross-linking agents such as trimethylolpropane triacylate, trimethylolpropane trimethacrylate, ethyleneglycol diacrylate, ethyleneglycol dimethacrylate, di- and triethyleneglycol diacrylate and dimethacrylate, 1,6-hexanediol diacrylate and dimethyacrylate, 1,4-butanediol diacrylate and dimethacrylate, and similarly substituted acrylamides and methacrylamides. In the final category of compounds, those which are both mesogenic and photopolymerizable, are materials such as cholesteryl 11-(methacrylamido)undecanoate.

It is again emphasized that second materials falling into any of these three categories are well known in the art, and that their selection, regardless of whether they are specifically identified herein, would be within the capability of an ordinary artisan. Illustrations of the utility of certain of these compounds are provided in Example 9, below.

The color intensity and/or optical response, and the uniformity which may be shown by various combinations of the present invention will also be affected by the texture of the cholesteric mesophase. Thus, as is well known in the art, some form of mechanical shearing may be necessary to yield coatings which exhibit desired optical responses.

A mechanical shear results in the preferential formation of a cholesteric planar texture in which the helicoidal pitch axis of the mesophase is aligned perpendicular to the substrate. Such alignment has been satisfactorily achieved by sandwiching the monomer compositions between two substrates (e.g., glass or polyester films), by spreading the composition on a substrate with a doctor blade, by any one of several printing processes (e.g., silk screen, flexographic, rotogravure, and letter press printing), and by dip coating.

Monomer compositions may be prepared in such manner as to give uniform or non-uniform multiresponse coatings. For example, non-uniformity of color would be expected if certain regions of the cholesteric mesophase were aligned such that the helicoidal pitch axis was at some angle other than ninety degrees; i.e., the axis was not perpendicular to the plane of the coating. This has been easily achieved by spreading the monomer compositions on a support surface with a brush. In addition, monomer compositions sandwiched between two flexible substrates, such as polyester film, can be deformed to generate a non-uniform texture and a multicolor effect. A simple downward force such as application of a heavy roller across a sandwich comprising the coating is enough to generate a non-uniform texture and a multi-response effect in the film. When materials that reflect visible light are used, characteristic of the non-uniform films is a high degree of iridescent color most readily observed at low angles of view to the plane of the film from the direction of the incident light. Thus, these films exhibit a combination of optical properties resulting from a cholesteric planar texture and a non-uniform texture in which the helicoidal pitch axis is at some angle other than ninety degrees.

Conversely, the artisan may elect to prepare a film from these monomers to generate a homeotropic texture in which the helicoidal pitch axis of the cholesteric mesophase is preferentially aligned parallel to the substrate. These films exhibit optical properties much different from those of the cholesteric planar texture. Thus, when using materials that can produce colored coatings, no color is evident when these films are viewed from near the specular direction. Uniform color is only observed at low angles of view to the substrate from near the direction of incident light. The colors are most intense when the substrate has a highly reflective surface (e.g., aluminum foil). The Bragg scattering phenomenon responsible for this peculiar reflective display has been well documented for low molecular weight cholesteric liquid crystals. Formation of the homeotropic texture requires that the cholesteric mesophase does not experience a mechanical shear. Films exhibiting the optical properties of the homeotropic texture can be prepared by dissolution of the liquid crystal composition in a compatible organic solvent, spreading the isotropic solution with a doctor blade and allowing the organic solvent to evaporate to give a homeotropic cholesteric mesophase.

The homeotropic texture state in combination with the planar textured state can be used to produce unique images. Thus, portions of a monomer coating in the homeotropic texture can be mechanically sheared in a selective manner to produce a cholesteric planar texture in those areas where the shear was applied. The result is a film that shows the specular reflection of a cholesteric planar texture in sheared areas and a low angle reflection from nearer the direction of incident light in areas not exposed to mechanical shear.

The random alignment of the focalconic cholesteric texture also can be used to produce unique images. The focalconic texture can be produced by cooling a cholesteric mesophase from its isotropic melt without mechanical shear. A slightly opaque colorless coating results. In an analogous manner to the homeotropic textured coatings, a colorless focalconic coating can be selectively transformed into a colored coating by mechanical shear to generate a cholesteric planar texture. The result is a film that shows the specific reflection of a cholesteric planar texture in sheared areas, and a colorless, slightly opaque coating in areas not exposed to shear.

Although polymerization of the coatings can be achieved by radical or thermal initiation, either in solution or in bulk, in all instances no fixed color or fixed optical response is observed. Instead, the polymers formed in solution or in bulk prefer to form colorless smectic mesophases or amorphous polymers. Accordingly, photopolymerization is required to achieve the objects of the present invention. The way in which photopolymerization is achieved may have an effect on the optical characteristics of the resulting polymer. Thus, where response duplication is desired, it appears desirable to use a high intensity light source which induces rapid polymerization. On the other hand, slower polymerization induced by lower intensity light may tend to produce polymeric films in which the response is shifted toward the red end of the spectrum.

Multi-response coatings may also be produced according to the present invention by sequential photopolymerization of the unpolymerized coatings. For example, a colored coating can be placed under a mask and irradiated to fix the color of the exposed areas. By removing the mask and changing the temperature of the partially cured coating, a color change can be induced in the non-polymerized portion of the coating. Upon subsequent irradiation, the second color can be fixed, thereby providing a two-colored coating. Of course, this technique may be extended to provide coatings having multiple optical responses, if desired by the artisan.

The unique ability of the coatings of the present invention to reflect specific wavelengths of light varying from the near ultraviolet region into the infrared region makes them remarkably useful. For example, their insensitivity to changes in temperature makes them especially suitable as filters, such as eyeglasses, or as bandpass, notch, and circular polarization filters in optical devices. Further, they will be well suited for use in reflective displays and so-called "Scheffer cells." In addition, where the coatings reflect in the visible spectrum and show bright iridescent colors, they will be useful as replacements for dyes and pigments. Thus, for example, they will be usable in floor and wall coverings, textiles, mats, paper products, and in the graphic arts in nonconventional inks. Further, they will also be useful for a variety of uses, such as thermal mapping to produce permanent images. Such applications offer particular advantages as, for example, for non-destructive testing techniques which avoid the use of photography.

The advantages and attributes of the present invention will become more apparent from the following examples which are intended to illustrate but not to limit the scope of the present invention.

EXAMPLES

Compounds referred to herein by roman numeral designation have the following structures, the details of their preparation being described in my copending application which was referred to above. As used herein, the temperature ranges are melting ranges unless otherwise indicated by an asterisk (*) or by parentheses. An asterisk signifies that the range is a mesophase range whereas parentheses indicate that the range is a monotropic mesophase range, the latter being measured as the temperature is decreased. With materials that have ascertainable melting ranges, the monotropic mesophase range is often below the melting range.

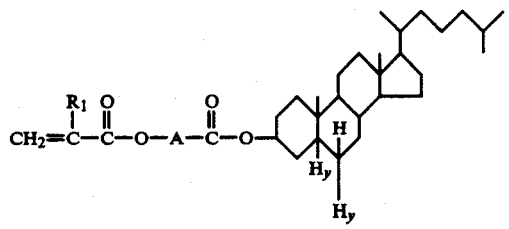

| Compound | $R_1$ | n | y | Melting or Mesophase Range (°C.) | |
|---|---|---|---|---|---|
| Va | H | 10 | 0 | *54.5–71.5 | |
| Vb | CH$_3$ | 10 | 0 | *58–64 | |
| Vc | H | 5 | 0 | *45.5–68.5 | |
| Vd | CH$_3$ | 5 | 0 | *48–57.5 | |
| Ve | H | 3 | 0 | 68.5–70.5 | (67.5) |
| Vf | CH$_3$ | 3 | 0 | 73–74 | (56.0) |
| Vg | H | 3 | 1 | 41–43 | (35.5) |
| Vh | CH$_3$ | 3 | 1 | 43–45 | (Below RT) |
| Vi | H | 10 | 1 | 62.5–64.5 | (58.0) |
| Vh | CH$_3$ | 10 | 1 | *33.7–49.0 | |

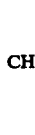
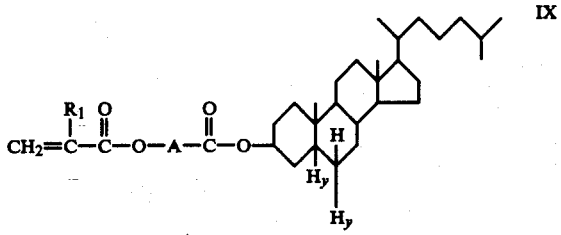

| Compound | $R_1$ | $R_3O(CH_2)_nO$ | y | Melting or Mesophase Range (°C.) | |
|---|---|---|---|---|---|
| IXa | CH$_3$ | 6 | 0 | 58.5–60 | (51.0) |
| IXb | CH$_3$ | 2 | 0 | 80–81 | (40.1) |
| IXc | H | 2 | 0 | 85.5–87 | (56.0) |
| IXd | H | 6 | 0 | *52–62 | |

| Compound | $R_1$ | $R_4O(CH_2CH_2O)_n$ | y | Melting or Mesophase Range (°C.) |
|---|---|---|---|---|
| IXe | CH$_3$ | 2 | 0 | 48.5–52.9 (33.1) |
| IXf | CH$_3$ | 3 | 0 | no m. pt. (6.5) |

EXAMPLE 1

This example sets forth the color ranges of various monomeric esters V of the present invention, measured with a Leitz optical microscope using transmitted light through cross-polars at 250X magnification. A Mettler FP5 temperature regulator and a Mettler FP52 hot stage were used to control the temperature, cooling being obtained by passing a nitrogen stream through a dry-ice cooled copper coil and, subsequently, the FP52 hot stage.

| Compound | Color Range (°C.) |
|---|---|
| Va | 57.8–59.2 |
| Vb | (55.8–55.3) |
| Vc | (48.5–33.0) |
| Vd | (51.0–26.5) |
| Ve | No Color |
| Vf | No Color |

EXAMPLE 2

This example describes the colored mesophase ranges obtained for mixtures of previously described paired monomers having identical alkyl chain lengths. The measurements were made using the apparatus described in Example 1, by heating a mixture of the monomers to a melt and cooling. The components were 1:1 mixtures by weight.

| Components | $R_2$ or $R_3O$ n | Color Range | Optical Response Range (°C.) |
|---|---|---|---|
| Va–Vb | 10 | Violet–Red | (56.5–55.9) |
| Vc–Vd | 5 | Violet–Orange | (50.2–29.5) |
| Ve–Vf | 3 | No Color | 61.5 Mesophase |
| Vg–Vh | 3 | No Color | Not Measured |
| IXa–IXd | 6 | Violet–Blue Violet | (51–1) |
| IXb–IXc | 2 | No Color | 47 Mesophase |

EXAMPLE 3

This example describes the colored mesophase ranges obtained for two-component mixtures of previously described monomers having different alkyl chain lengths. Color measurements were made as described in Example 1. The components were 1:1 mixtures by weight.

| Components | $R_2$ or $R_3O$ n | Color Range | Optical Response Range (°C.)** |
|---|---|---|---|
| Va | 10 | violet–orange red | (68– –15) |
| Ve | 3 | | |
| Vb | 10 | green–orange | (47.5– –15) |
| IXc | 2 | | |

**–15° C. is the lower temperature limit of the thermostated water bath.

EXAMPLE 4

This example describes the colored mesophase ranges obtained for mixtures of previously described monomers having different alkyl chain lengths. The mixtures comprised Irgacure 651 photoinitiator and, optionally, other indicated components. Irgacure 651 is 2,2-dimethoxy-2-phenyl acetophenone. Color measurements were made using a thermostated water bath.

| Components | Wt. (g) | Color Range | Optical Response Range (°C.) |
|---|---|---|---|
| Vb | 1.0 | Violet–Red | (50– –5) |
| Ve | 1.0 | | |
| Photoinitiator | 0.04 | | |
| Vb | 0.25 | Blue Green–Red | (40– –5) |
| Vh | 0.25 | | |
| Photoinitiator | 0.01 | | |
| Vd | 0.50 | Green–Red | (45–30) |
| Vf | 0.50 | | |
| Photoinitiator | 0.02 | | |
| Vb | 0.50 | Orange Green–Red | (32–0) |
| IXb | 0.50 | | |
| Photoinitiator | 0.02 | | |
| Methyl methacrylate | 0.05 | | |
| Vd | 0.40 | Violet–Orange | (16–6) |
| Vc | 0.40 | | |
| Va | 0.20 | | |
| Photoinitiator | 0.02 | | |
| Trimethylolpropane triacrylate | 0.06 | | |
| Vb | 0.5 | Green–Red | (37–0) |
| IXe | 0.5 | | |
| Photoinitiator | 0.01 | | |

EXAMPLE 5

This example illustrates a colored polymeric film derived from a film comprising a single monomer of the present invention and 1% Irgacure 651 photoinitiator. The table lists "apparent absorbance" maximum ($\lambda$ max), percentage transmittance (%T) and half-width at half-height (HW-HH) of the film and the resulting polymer when the film was photopolymerized at an indicated temperature. The polymerizations in this and other examples were achieved by exposing the film to a 450-watt mercury arc lamp for about 30 seconds.

| | | Monomeric Film | | | Polymer | | |
|---|---|---|---|---|---|---|---|
| Component | Film Temp. (°C.) | $\lambda$ max (nm) | % T | HW-HH (nm) | $\lambda$ max (nm) | % T | HW-HH (nm) |
| Vg | 25 | 738 | 53 | 45 | 738 | 55 | 50 |
| IXd | 25 | 438 | 49 | 27 | 441 | 46 | 33 |

EXAMPLE 6

This example illustrates several colored polymeric films derived from indicated monomer compositions. All films contained 1% Irgacure 651 photoinitiator. Also, four of the films contained 3% trimethylolpropane triacrylate, excluding pair Vb:IXb which contained 3% trimethylolpropane trimethacrylate.

| | | Monomeric Film | | | Polymer | | |
|---|---|---|---|---|---|---|---|
| Composition (by weight) | Film Temp. (°C.) | $\lambda$ max (nm) | % T | HW-HH (nm) | $\lambda$ max (nm) | % T | HW-HH (nm) |
| Va:Ve (1:1) | 23 | 505 | 49 | 18 | 505 | 51 | 20 |
| Vb:IXb (1:1) | 25.5 | 585 | 42 | 21 | 585 | 42 | 21 |
| Vc:IXc (3:1) | 25.5 | 563 | 46 | 25 | 568 | 45 | 26 |
| Vc:IXc* (1:1) | 24.5 | 950 | 53 | 50 | 950 | 53 | 50 |
| IXc:IXd* (1:1) | 25.5 | 1260 | 59 | 112 | 1260 | 59 | 112 |

*Colorless mixture

EXAMPLE 7

This example illustrates the differently colored polymeric films which may be produced by subjecting a monomeric mixture to different temperatures and then exposing the colored film to UV radiation. The monomeric mixture described for this example comprises a 1:1 by weight mixture of compounds Vb and Vf. The apparent absorbance maximum and color are reported for each film.

| Film Temperature (°C.) | λ max (nm) | Color |
|---|---|---|
| 45 | 485–470 | Blue - Green |
| 35 | 515 | Green |
| 25 | 542 | Lime Green |
| 11 | 605 | Orange |

A comparable experiment conducted with a 1:1 mixture of compounds Va and Ve gave the following results:

| Film Temp. (°C.) | λ max (nm) | Transmittance (%) | HW-HH (nm) | Color |
|---|---|---|---|---|
| 32 | 480 | 47 | 32 | blue |
| 23 | 505 | 51 | 20 | blue-green |
| 18 | 530 | 48 | 42 | lime-green |
| 10 | 574 | 48 | 40 | orange |

EXAMPLE 8

This example illustrates the effect of non-mesogenic materials on a mixture of monomers. A 1:1 by weight mixture of compounds Vc and Vd gave a colored mesophase range of 50.2°–29.5° C., as indicated in Example 2. When 2% by weight of a photoinitiator was added, the colored mesogenic range shifted to 43°–20° C.

EXAMPLE 9

This example illustrates polymer films which can be prepared from a compound of the present invention and unrelated materials, as follows:

crystalline material which is not capable of participating in a photopolymerization reaction. All three are suitable to permit formation of a film that exhibits cholesteric liquid crystalline properties. To illustrate this, films were prepared and photopolymerized using 1% Irgacure 651 photoinitiator and 3% trimethylolpropane trimethacrylate.

| Composition (weight ratio) | | Film Temp. (°C.) | Monomeric Film | | | Polymer | | |
|---|---|---|---|---|---|---|---|---|
| | | | λ max (nm) | % T | HW-HH (nm) | λ max (nm) | % T | HW-HH (nm) |
| Vd:A | (2:1) | 24 | 355 | 43 | 30 | 350 | 41 | 35 |
| Vb:B | (1:1) | 25 | 388 | 52 | 15 | 400 | 42 | 40 |
| Vg:C | (4:1) | 25 | 700 | 51 | 33 | 730 | 55 | 52 |

Although the film derived from pair Vd:A demonstrates suitable optical properties, it is not as stable as other films in which both members of the pair are polymerizable. For example, when this polymeric film was heated at 60° C. for one day, it underwent crystallization to give an opaque colorless film.

EXAMPLE 10

This example illustrates a process for generating an iridescent multi-color effect in a polymeric film by creating a non-uniform texture in the film. A liquid crystal composition comprising by weight 100 parts each of compounds Vb and Vh, 2 parts of benzophenone, 2 parts of Irgacure 651 and 6 parts of trimethylolpropane trimethacrylate cross-linking monomer was mixed, melted and sandwiched between two pieces of clear polyester film. A hand-held roller was moved across the sandwiched material with enough force to deform the liquid crystal phase, thereby providing a non-uniform texture. The film was cooled in a water bath to 9° C. and

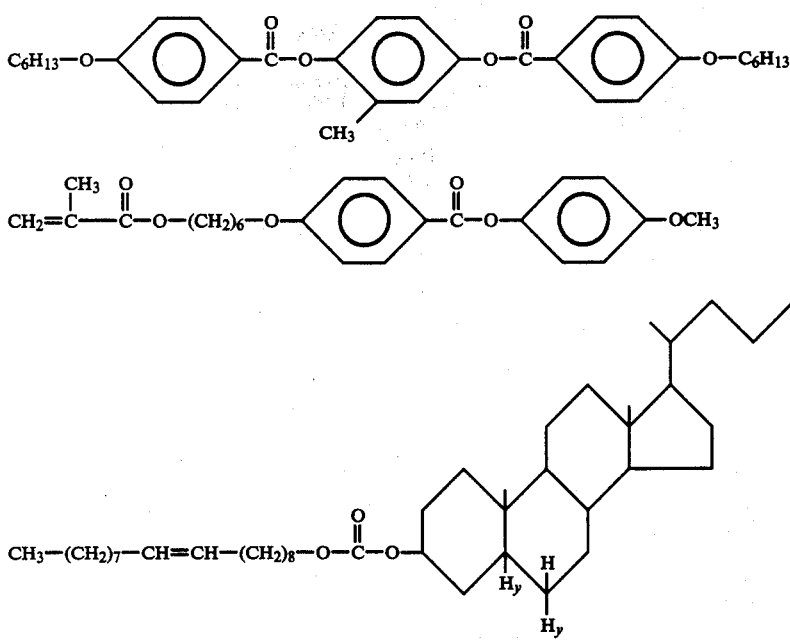

Compound A is a nematic liquid crystalline material which is not capable of participating in a photopolymerization process. Compound B is a nonmesogenic material that is capable of participating in a photopolymerization reaction. Compound C is a cholesteric liquid irradiated for 30 seconds using a 450-watt mercury arc lamp to fix the iridescent multi-color effect. When viewed at a ninety degree angle to the support surface with the incident light at the same angle (i.e., specular reflection), a predominately orange color was noted; however, when the incident light was placed at a relatively low angle to the substrate, a vivid iridescent orange-pink color was observed at a ninety degree angle to the substrate. In addition, a predominately iridescent violet color was exhibited at a low angle of view to the substrate when the substrate was viewed from a point in the direction of the incident light. These results indicate that, although the optical response of the film is fixed, these responses may have different appearances depending upon the origin of the incident light and upon the point from which the color is observed.

As an added note, photopolymerizable non-mesogenic monomers such as trimethylolpropane triacrylate which do not closely resemble mesogenic materials tend to be less supportive of a cholesteric mesophase than are monomers that do resemble mesogenic materials. Accordingly, care must be taken to avoid adding excess quantities of conventional crosslinkers. Typically it has been found undesirable to add more than about 10% of such materials.

EXAMPLE 11

This example illustrates a process for preparing a polymeric film in a homeotropic texture wherein the helicoidal pitch axis of the cholesteric mesophase is preferentially aligned parallel to the support surface. A composition comprising by weight 300 parts of compound Ve, 100 parts of compound Va, 8 parts of benzophenone, 4 parts of Irgacure 651 and 12 parts of trimethylolpropane triacrylate was dissolved in two volumes of petroleum ether:dichloromethane (4:1). The isotropic solution was coated onto an aluminum foil surface using a Bird blade and the solvent was evaporated to give a film. The dried film was irradiated with a 450-watt mercury lamp for one minute in a nitrogen-purged chamber at room temperature to give a tack-free polymeric film. This film was colorless in specular reflection; however, at low angles of view to the substrate in the direction of the incident light, the film exhibited a uniform pastel violet color. These results indicate that, although the film was not mechanically aligned, the film nevertheless demonstrated a fixed optical response due to the alignment of the helicoidal pitch axis parallel to the plane of the support surface.

EXAMPLE 12

This example illustrates an imaging process whereby selective portions of a homeotropic textured cholesteric mesophase film residing on a planar support surface can be mechanically aligned to provide a different optical response. A monomeric film as described in Example 11 was prepared on a glass substrate to yield a film with a homeotropic texture. Portions of the film were subjected to a mechanical shear by the movement of a glass rod over the film to generate a grid pattern. The film was then irradiated as previously described to provide a solid, tack-free coating. The grid pattern was apparent as a bright orange color on a colorless background when viewed at a ninety degree angle to the substrate (i.e., specular reflection); however, at low angles of view to the substrate in the direction of the incident light, the grid appeared colorless on a violet background.

This invention is not restricted solely to the descriptions and illustrations provided above, but encompasses all modifications envisaged by the following claims.

What is claimed is:

1. A polymeric coating exhibiting a fixed cholesteric optical response, said coating being obtained by photopolymerizing a composition comprising a photopolymerizable monomer having the structure:

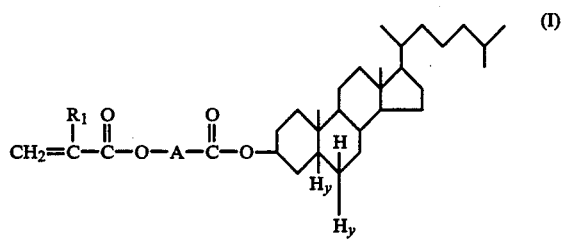

where $R_1$=H or $CH_3$, A=—$R_2$—, —$R_3O$—, or —$R_4O$—, $R_2$=an alkylene chain having from 3–14 methylene or lower alkyl-substituted methylene groups, $R_3$=an alkylene chain having from 2–14 methylene or lower alkyl-substituted methylene groups, $R_4$=an alkylene ether, diether or triether having a total of from 3–14 carbon atoms in the alkylene moieties, provided that the terminal alkylene moiety adjacent the carbonate moiety comprises not less than two carbon atoms, and y=0 or 1; and a suitable photoinitiator, said composition having exhibited cholesteric liquid crystalline properties at the time photopolymerization occurred.

2. The invention as set forth in claim 1 hereof wherein said composition comprises a second material which facilitate to permit formation of a coating that exhibits cholesteric liquid crystalline properties.

3. The invention as set forth in claim 2 hereof wherein said second material is a compound having the structure of Formula I.

4. The invention as set forth in claim 2 hereof wherein said second material is a photopolymerizable material having a structure which is different from that of Formula I.

5. The invention as set forth in claim 2 hereof wherein said second material is a mesogenic material having a structure which is different from that of Formula I.

6. The invention as set forth in claim 5 hereof wherein said second material comprises a photopolymerizable moiety.

7. The invention as set forth in claim 2 hereof wherein said composition comprises a cross-linking agent.

8. The invention as set forth in claim 2 hereof wherein at least one of the alkylene moieties of $R_4$ is lower-alkyl substituted.

9. The invention as set forth in claim 2 hereof wherein said coating selectively reflects visible light.

10. The invention as set forth in claim 9 hereof wherein said coating selectively reflects visible light to provide multiple color effects.

11. The invention as set forth in claim 2 hereof wherein said coating selectively reflects ultraviolet light.

12. The invention as set forth in claim 2 hereof wherein said coating selectively reflects infrared light.

13. The invention as set forth in claim 2 hereof wherein said composition is substantially uniformly mechanically aligned to provide a cholesteric planar texture.

14. The invention as set forth in claim 2 hereof wherein said composition is selectively mechanically aligned to provide a cholesteric planar texture in selected areas.

15. The invention as set forth in claim 2 hereof wherein said coating comprises a homeotropic texture.

16. The invention as set forth in claim 2 hereof wherein said coating comprises a focalconic texture.

* * * * *

UNITED STATES PATENT AND TRADEMARK OFFICE
CERTIFICATE OF CORRECTION

PATENT NO. : 4,637,896
DATED : January 20, 1987
INVENTOR(S) : Paul J. Shannon

It is certified that error appears in the above-identified patent and that said Letters Patent are hereby corrected as shown below:

In the Specification, in column 7, line 42, "p-methoxyphenyl-p-(6-methacryloylox-" should read --p-methoxyphenyl-p-(6-methacryloyloxy--.

In the Specification, under EXAMPLES in column 10, line 25, please add:

$$\text{--where A} = R_2 = (CH_2)_n \text{--; and}$$

same column, line 50, please add:

$$\text{--where A} = R_3O = (CH_2)_nO, \text{ or}$$
$$R_4O = (CH_2CH_2O)_n \text{--.}$$

Signed and Sealed this

Seventh Day of April, 1987

Attest:

DONALD J. QUIGG

*Attesting Officer*   *Commissioner of Patents and Trademarks*